July 3, 1928.  
P. M. MILLER  
1,675,371
DEMOUNTABLE TIRE CARRYING RIM
Filed Oct. 10, 1922
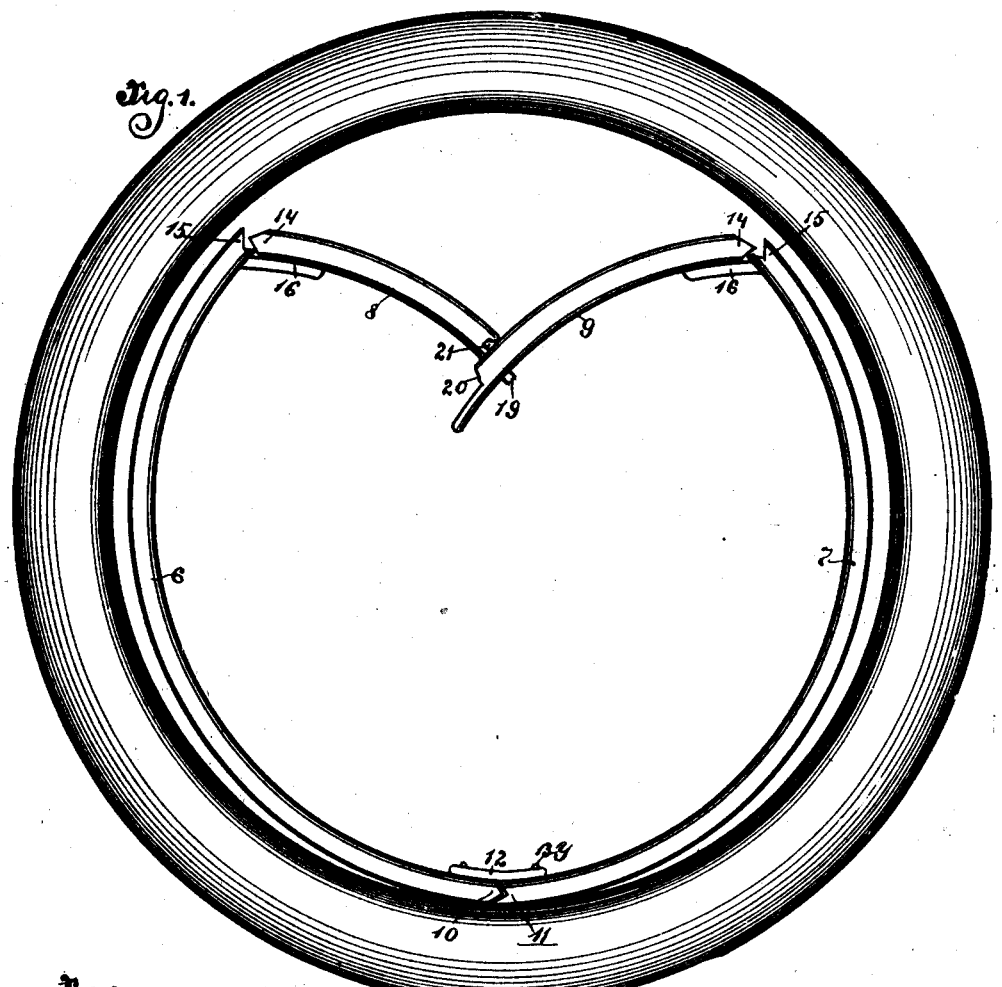
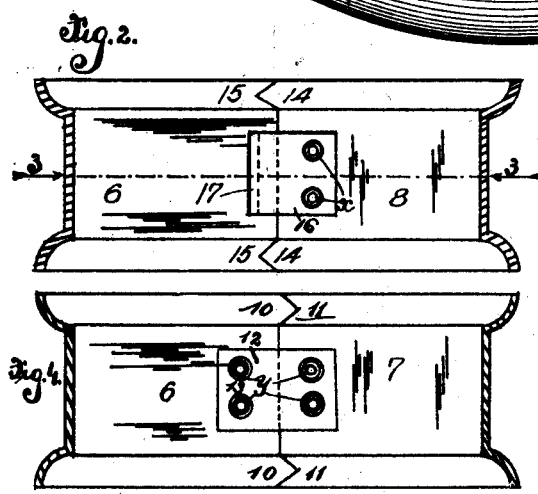
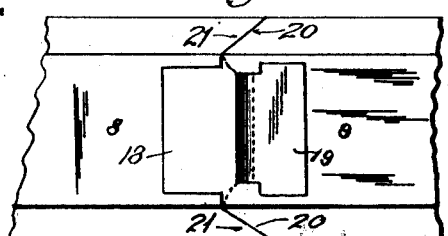
Inventor  
Philip M. Miller Patented July 3, 1928.

1,675,371

UNITED STATES PATENT OFFICE.

PHILIP M. MILLER, OF BROOKLYN, NEW YORK, ASSIGNOR, BY MESNE ASSIGNMENTS, TO R. E. H., INCORPORATED, OF BROOKLYN, NEW YORK, A CORPORATION OF NEW YORK.

DEMOUNTABLE TIRE-CARRYING RIM.

Application filed October 10, 1922. Serial No. 593,915.

The present invention relates to improvements in demountable rims for the wheels of vehicles, the object of the invention being to provide an improvement to the construction of Leonard P. Woodbury, the number of whose patent is 1,201,129, dated October 10, 1916, whereby the construction of this type will properly function with a tire as well as on a wheel. The abutting edges between two sections of the construction are provided with a lug and a recess engaging one another, in connection with other means, for strengthening it and, at the same time, provide a hinging articulation between two of the sections of the rim construction. Another object is that when the rim construction is mounted on a wheel and wedged thereon by the usual clamps, the abutting edges thereof will not spread apart, one from another.

In my improvement I eliminate all the undesirable defects and provide a construction which physically resembles the construction above referred to, but mechanically or functionally it differs and possesses features which make the construction durable, practical and safe for use.

In the accompanying drawing, Fig. 1 is a side elevation of the tire carrying rim, showing the rim in its collapsed stage; Figs. 2 and 4 are fragmentary sections of the rim, showing the joint construction; Fig. 3 is a cross sectional view as on line 3—3, Fig. 2, while Fig. 5 is a view showing the toggle section connections.

Referring to the drawings, the rim includes a plurality of sections 6, 7, 8 and 9. The sections 6 and 7 constitute together the main section, while the sections 8 and 9 constitute the toggle sections. The section 6 is provided with a suitable lug 10, which enters into the corresponding recess 11 of section 7 and the joint of these sections is co-actively formed by the flexible plate 12 rigidly secured to the ends of the respective sections 6 and 7 by means such as shown at 13$^Y$. Each of the sections 6 and 7 is provided with a recess 15 which receives a lug 14 extending from one of the toggle sections 8 and 9. Plates 16 are rigidly secured to the ends of the toggle sections 8 and 9, as shown at X, and cross the joints between the toggle sections and the sections 6 and 7 and enter into slots in the respective sections, as shown at 17, for the purpose of forming articulative joints between the toggle sections 8 and 9 and the main sections 6 and 7. The free ends of the toggle sections are also movably connected one with another, as shown at 18, 19, 20 and 21, for the purpose of permitting the toggles to function in relation with the main sections 6 and 7. The articulative joint between each main section and toggle section is formed between the lugs 14 and recess 15 together with plates 16. The latter form integral parts with the toggles and articulative parts with the main sections. The extension or shoulder 17 of each plate 16 while sitting in the slot of each of the main sections, prevents longitudinal separation of these sections, while the lugs and recesses of the main and toggle sections co-actively prevent radial separation of one from the other.

The lug and recess 10 and 11 of the main sections likewise form a joint therebetween with the cooperation of the plate 12 which is rigidly secured respectively to the ends thereof. The rim in this position plainly illustrates its separation from the tire so as to easily remove the former from the latter while when the toggles 8 and 9 are outwardly moved towards the tire, all of the sections contact with the inner periphery of the tire and the circumference of the rim is extended or lengthened in relation with the periphery of the tire, and the lugs of the toggles snugly fit in the recesses of the main sections as well as the lugs of one main section in relation with the recess of the other main section, so that radial movement or circumferential separation of the section is prevented. When the rim with the tire is placed on the wheel and the above described lugs wedged in between the rim and wheel the respective lugs and recesses will counterbalance the exertion applied thereto by the wedging portions of the lugs, and the true circumference or radius will be sustained as a result of locking the rim with the wheel.

I claim:

1. The combination with a demountable tire carrying rim including a plurality of main rim sections, of a joint between two sections thereof including abutting ends, one end having a lug engaging with a recess in the adjacent end, in combination with a member overlapping said joint and secured to the ends of two adjacent sections, and toggle sections having abutting ends, one end of each of the toggle sections having a lug engaging with a recess in the outer end of a main section, and a member rigidly extending from the abutting end of each of the toggle sections and overlapping the adjacent end of the main section and then entering into a slot therein, thereby making a hinging articulation therebetween and permitting movement of the inner ends of the toggle sections inwardly for simultaneously releasing the main sections from a tire.

2. The combination with a demountable tire carrying rim including main rim sections and toggle members, collectively forming a channeled annulus, of a joint between the main sections including a lug extending from the end of one section and movably engaging with a corresponding recess in the end of the adjoining section, in combination with a flexible member rigidly secured to the ends of the main sections, and said toggle members each having lugs movably engaging with recesses in the ends of said main sections, and a member rigidly extending from each of the toggle members and pivotally engaging in a slot in the end of an adjacent main section, thereby providing a sliding articulation therebetween for permitting movement of the inner ends of the toggle members inwardly and of the main sections one towards another for simultaneously releasing the rim from a tire, and means permanently pivoting the free ends of the toggle members.

3. The combination with a plurality of arcuate channeled sections collectively forming a tire-carrying annulus, of a joint between two sections including rigid means on one of said sections slidably engaging with corresponding means of the other said section, a flexible member rigidly secured to the ends of said sections, the said member holding the said sections in a pivotal engagement one with another, and means pivotally holding the said other sections one with another.

PHILIP M. MILLER.